US011920681B2

(12) United States Patent
Jordan et al.

(10) Patent No.: US 11,920,681 B2
(45) Date of Patent: Mar. 5, 2024

(54) SEAL ASSEMBLY

(71) Applicant: Trelleborg Sealing Solutions Germany GmbH, Stuttgart (DE)

(72) Inventors: Holger Jordan, Neuhausen a.d.F. (DE); Mandy Wilke, Böblingen (DE)

(73) Assignee: Trelleborg Sealing Solutions Germany GmbH, Stuttgart (DE)

( * ) Notice: Subject to any disclaimer, the term of this patent is extended or adjusted under 35 U.S.C. 154(b) by 494 days.

(21) Appl. No.: 16/563,078

(22) Filed: Sep. 6, 2019

(65) Prior Publication Data

US 2019/0390774 A1    Dec. 26, 2019

Related U.S. Application Data

(63) Continuation of application No. PCT/EP2018/055600, filed on Mar. 7, 2018.

(51) Int. Cl.
| F16J 15/16 | (2006.01) |
| F16J 15/3212 | (2016.01) |
| F16J 15/3232 | (2016.01) |
| F16J 15/3252 | (2016.01) |
| F16J 15/3256 | (2016.01) |

(52) U.S. Cl.
CPC ......... *F16J 15/164* (2013.01); *F16J 15/3212* (2013.01); *F16J 15/3232* (2013.01); *F16J 15/3252* (2013.01); *F16J 15/3256* (2013.01)

(58) Field of Classification Search
CPC .. F16J 15/3212; F16J 15/3232; F16J 15/3208; F16J 15/3252
See application file for complete search history.

(56) References Cited

U.S. PATENT DOCUMENTS 2,630,357 A * 3/1953 Smith ................... F16J 15/3268
                                                    277/439
2,772,931 A * 12/1956 Biedermann ............ F16J 1/008
                                                    277/437

(Continued)

FOREIGN PATENT DOCUMENTS

| CN | 101725714 A | 6/2010 |
| CN | 201615223 U | 10/2010 |

(Continued)

*Primary Examiner* — Eugene G Byrd
*Assistant Examiner* — L. Susmitha Koneru
(74) *Attorney, Agent, or Firm* — Orbit IP (57) ABSTRACT

A seal assembly includes a first and second machine element, a seal and a support ring. The support ring has a first side edge facing a high-pressure side which is partially convexly curved, formed obliquely or is partially formed at an acute angle relative to a movement axis of the two machine elements. The seal has a retaining portion and a primary sealing lip extending from the retaining portion on the high-pressure side and abuts in a dynamically sealing manner against a sealing surface of the second machine element. The primary sealing lip directly abuts and is supported over the majority of its longitudinal extent on the first side edge of the support ring on the low-pressure side. The retaining section of the seal is held clamped between the support ring and the first machine element and abuts the first machine element in a statically or indirectly statically sealing manner.

20 Claims, 7 Drawing Sheets

(56) References Cited

U.S. PATENT DOCUMENTS

| | | | | |
|---|---|---|---|---|
| 3,443,845 | A | * | 5/1969 | Walchle ............... F16J 15/3228 277/575 |
| 3,467,395 | A | * | 9/1969 | Yoshiro ............... F16J 15/3268 277/925 |
| 3,663,024 | A | * | 5/1972 | Traub ............... F16J 15/3208 277/910 |
| 3,980,309 | A | * | 9/1976 | Dechavanne ........ F16J 15/3224 277/550 |
| 4,067,584 | A | | 1/1978 | Hunger |
| 4,729,569 | A | * | 3/1988 | Muller ............... F16L 27/087 277/584 |
| 4,755,115 | A | * | 7/1988 | Akaike ............... F16J 15/3232 418/104 |
| 5,118,206 | A | * | 6/1992 | Otto ............... F16C 33/768 384/477 |
| 5,183,271 | A | * | 2/1993 | Wada ............... F16J 15/3244 277/575 |
| 5,209,502 | A | * | 5/1993 | Savoia ............... F16J 15/3228 277/575 |
| 5,303,935 | A | * | 4/1994 | Saksun ............... F16J 15/3268 277/944 |
| 5,380,015 | A | * | 1/1995 | Laflin ............... F16J 15/3228 277/570 |
| 6,007,069 | A | * | 12/1999 | Sadowski ............... F16J 15/363 277/374 |
| 6,688,603 | B2 | * | 2/2004 | vom Schemm ...... F16J 15/3228 277/556 |
| 6,840,521 | B2 | * | 1/2005 | Ikeda ............... F16J 15/322 277/560 |
| 8,944,436 | B2 | * | 2/2015 | Uhrner ............... F16J 15/3252 277/573 |
| 9,163,731 | B2 | * | 10/2015 | Sanada ............... F16J 15/3228 |
| 9,239,116 | B2 | * | 1/2016 | Kreutzer ............... F16J 15/3204 |
| 11,131,386 | B2 | * | 9/2021 | Dahlhaus-Preussler ................... F16J 15/3232 |
| 2004/0007826 | A1 | * | 1/2004 | Lutaud ............... F16J 15/3244 277/549 |
| 2007/0069476 | A1 | * | 3/2007 | Dahlheimer ............. F16J 15/38 277/370 |
| 2007/0138750 | A1 | * | 6/2007 | Warnecke ............. F16J 15/3268 277/549 |
| 2007/0210529 | A1 | * | 9/2007 | Kreutzer ............. F16J 15/3232 277/551 |
| 2008/0136111 | A1 | * | 6/2008 | Uhrner ............... F16J 15/3252 277/345 |
| 2010/0237568 | A1 | * | 9/2010 | Kreutzer ............... F16J 15/3252 277/564 |
| 2010/0244389 | A1 | * | 9/2010 | Sanada ............... F16J 15/3228 277/565 |
| 2011/0140369 | A1 | | 6/2011 | Lenhert |
| 2014/0265139 | A1 | * | 9/2014 | Dilmaghanian ....... F16J 15/166 277/572 |
| 2014/0353915 | A1 | * | 12/2014 | Jordan ............... F16J 15/3204 277/572 |
| 2015/0184751 | A1 | * | 7/2015 | Epshetsky ............ F16J 15/3252 277/589 |

FOREIGN PATENT DOCUMENTS

| | | | |
|---|---|---|---|
| CN | 204253867 U | 4/2015 | |
| DE | 198 41 123 A1 | 4/2000 | |
| DE | 199 06 733 A1 | 9/2000 | |
| DE | 10 2014 214684 A1 | 1/2016 | |
| DE | 20 2016 102691 U1 | 6/2016 | |
| EP | 0170928 * | 11/1988 | ........... F16J 15/3244 |
| JP | S51-29657 A | 3/1976 | |
| JP | S56-16313 A | 2/1981 | |
| JP | H08-4902 A | 1/1996 | |
| JP | H11141688 A | 5/1999 | |
| JP | H11-218228 A | 8/1999 | |
| JP | 2000-329234 A | 11/2000 | |
| JP | 2003-269518 A | 9/2003 | |
| JP | 2005023966 A | 1/2005 | |
| JP | 2008019900 A | 1/2008 | |
| WO | WO-2005010412 A2 * | 2/2005 | ........... F16J 15/3256 |

* cited by examiner

SEAL ASSEMBLY

CROSS-REFERENCE TO RELATED APPLICATIONS

This continuation application claims priority to PCT/EP2018/055600 filed on Mar. 7, 2018 which has published as WO 2018/166863 A1 and also the German application number 10 2017 204 374.1 filed on Mar. 16, 2017, the entire contents of which are fully incorporated herein with these references.

DESCRIPTION

Field of the Invention

The invention relates to a seal assembly having a first and a second machine element, which are mutually spaced, thereby forming a seal gap arranged between the two machine elements and which are arranged in a movable manner relative to each other along/about a movement axis. A seal serves to seal a pressurizable high-pressure side of the seal gap with respect to a low-pressure side of the seal gap. The seal assembly includes a support ring for the seal.

Background of the Invention

Such seal assemblies have been established in practice in a variety of technical applications and can be found in piston-cylinder units, such as for hydraulic applications, as well as in drive shafts.

The seal assemblies must meet ever higher demands on the tightness and the life of the seal used at low production costs. It is therefore an object of the invention to provide a seal assembly which is particularly simple but highly resilient and inexpensive to manufacture.

SUMMARY OF THE INVENTION

The task relating to the seal assembly is achieved by a seal assembly having the features specified in claim 1. Further developments of the invention are specified in the dependent claims and in the description.

The seal assembly according to the invention is characterized in that the support ring has a first side edge facing the high-pressure side, which is convexly curved at least partially towards the high-pressure side H or which is arranged at least partially at an angle $\alpha$, $\beta$ relative to the movement axis at an acute angle. The seal has a retaining portion and at least one primary sealing lip, which extends away from the first retaining portion and which abuts a sealing surface of the second machine element in a dynamically sealing manner. The primary sealing lip directly abuts the first side edge of the support ring on the low-pressure side over a majority of its longitudinal extent and is directly supported on this side edge of the support ring. The retaining portion of the seal is arranged held in radial press fit between the support ring and the first machine element and abuts the first machine element in a directly or indirectly static sealing manner.

The seal assembly according to the invention is inexpensive to manufacture and assemble. The seal has a high sealing capacity. Since the primary sealing lip abuts the first side edge of the support ring over a majority, preferably with more than 80%, of its longitudinal extent and is supported on this side edge on the low-pressure side, the primary sealing lip can be reliably protected during operation from mechanical or thermal overload. On the one hand, the support ring ensures a reliable support in the direction of the low-pressure side and thus deformation protection of the primary sealing lip when pressure is applied to the high-pressure side H of the seal assembly. An extrusion of the primary sealing lip into the seal gap can thereby be reliably counteracted. In the case of a radially sealing seal (=radial seal ring), the primary sealing lip which extends in the axial and in the radial direction can balance or compensate for eccentricity of the two machine elements or also, in the case of an axially sealing seal, relative movements of the two machine elements in a limited manner, without this thereby leading to an impairment of the sealing function of the seal. Through the support ring, an excessive and thus wear-prone contact surface pressure of the seal or the sealing edge and the sealing surface by the second machine part entraining the support ring in a radial sealing seal in the radial direction and in an axial sealing seal in the axial direction can be counteracted. Since the first side edge of the support ring to the high-pressure side H is designed outwardly curved or obliquely running from the low-pressure side N in the direction of the high-pressure side H to the sealing surface, the primary sealing lip can reliably be relieved in the contact surface area with the sealing surface, or in the region of its sealing edge. Through the support ring, excessive contact surface pressure when pressurizing the high-pressure side of the seal gap with a large or very large operating pressure can also be prevented, because excessive deformation of the primary sealing lip in the direction of and against the sealing surface of the second machine element is limited by the support ring.

The support ring may be arranged according to one embodiment of the invention in the normal operation of the seal assembly spaced from the second machine element. In the case of a seal sealing dynamically in a radial direction, a slight eccentricity of one or both machine elements and, in the case of a seal sealing dynamically in the axial direction, slight axial relative movements do not lead directly or immediately to a contacting of the support ring by the machine element having the sealing surface.

If the support ring according to an alternative embodiment of the invention abuts the second machine element directly, then a particularly sensitive response of the support ring to an eccentricity or to an axial relative movement of the machine elements and thus a particularly reliable protection of the primary sealing lip from mechanical/thermal overstress can be achieved. Through such a permanent contact of the support ring with the sealing surface, the seal can also be reliably protected against blowby or an undesirable extrusion into the seal gap even in high and highest pressure applications of the seal assembly.

According to the invention, the support ring may have tribo structures on its side facing the sealing surface of the second machine element. Through such tribo structures, on one hand, the return capacity, i.e. the so-called return drag capacity, of the sealing device with respect to fluid coming from the high-pressure side H to the low-pressure side N of the primary sealing lip can be improved. At the same time, the lubrication and cooling of the sealing lip in the contact surface area with the sealing surface can thereby be further improved. It should be noted that the tribo structures are arranged in an radial inner seal (in the radial direction) on the inner circumferential side and in a radial outer seal (in the radial direction) on the outer circumferential side thereof. In an axial seal, the tribo structures are located at the top or bottom of the seal.

According to one preferred embodiment of the invention, the support ring or the seal is provided with a profile projection which extends away from the support ring and the seal and into a recess corresponding to the profile projection of the respective other component. As a result, the seal can be rotatably coupled with the support ring and secured against unwanted slipping from the support ring. This is advantageous for the reliability of the seal assembly and allows a further simplified assembly of the seal assembly. The profile projection can be arranged held positive-locking and/or friction-locking in the recess. Particularly preferably, the support ring and/or seal ring have several such profile projections and recesses. The profile projections are preferably arranged spaced apart in the circumferential direction of the seal. The profile projections can also be arranged in several rows offset from one another on the support ring or on the seal. The support ring may alternatively have profile projections, which are designed in the form of claw elements, which engage in the material of the seal. The seal does not therefore have to have prefabricated recesses for the profile projections, whereby the manufacturing costs can be reduced and the assembly of the seal assembly can be further simplified. The profiled protrusions of the support ring designed as claw elements can thereby engage in the seal displaceably or else engage into the material of the seal by causing local destruction of the sealing material, i.e. a cutting of the claw elements. The profile projections can be designed according to the invention, in particular in pointed cone or pyramidal shapes.

According to the invention, the seal can comprise a secondary sealing lip or a wiper lip which abuts the sealing surface of the second machine element. The wiper lip differs from the secondary seal lip substantially with respect to the contact surface angle of its sealing edge. In the wiper lip, the low-pressure side contact surface angle is greater than the high-pressure side contact surface angle. In the secondary seal lip, the high-pressure side contact surface angle is larger than the low-pressure side contact surface angle. The support ring preferably has a second side edge facing the low-pressure side N, which is arranged at least partially convex toward the low-pressure side or inclined at an acute angle to the movement axis. The secondary sealing lip or wiper lip is advantageously directly adjacent to the second side edge of the support ring and is supported on the high-pressure side. In the case of a secondary sealing lip, the seal can be realized, in the sense of a tandem seal, as a particularly reliable protection against undesired passage of a fluid arranged on the high-pressure side to the low-pressure side. In the case of a wiper lip, in particular in the case of a translational relative movement of the two machine elements along the movement axis, an undesired entry of impurities such as dirt particles, water, etc. onto the high-pressure side of the seal gap can be counteracted.

The secondary sealing lip or wiper lip, according to the invention, preferably directly abuts the second side edge of the support ring over a majority, preferably over more than 80%, of it and is supported thereon. As a result, in the case of a translational relative movement of the two machine elements, an undesired turning over of the wiper or sealing lip and thus a loss of function thereof can be counteracted. In addition, the secondary sealing lip (or the wiper lip) can perform a sealing function even at a pressure reversal in the seal gap, i.e. a pressurization of the low-pressure side with a greater pressure in relation to the operating pressure prevailing on the high-pressure side.

The primary sealing lip or the wiper lip/secondary sealing lip of the seal can each be provided with an elastically deformable pretensioning element by means of which the respective primary sealing lip or the secondary sealing lip/wiper lip is pretensioned against the sealing surface of the second machine element. As a result, the sealing or wiper function of the components can be further increased. The elastically deformable pretensioning element may be an elastomer or rubber ring or a worm spring or the like.

The seal is preferably made in one piece. This offers manufacturing advantages and allows a particularly simple installation and maintenance of the seal assembly.

According to one particularly preferred embodiment of the invention, a tension disk made of an elastically deformable material is arranged between the seal and the first machine element, which rests in a directly statically sealing manner on the first machine element. The tension disk is preferably made of an elastomer or rubber. With this design, a reliable sealing of the seal gap with respect to the first machine element can be achieved even when using a seal material less suitable for static sealing purposes.

According to one particularly advantageous embodiment of the invention, the seal is stretched by the tension disk at least partially in the radial and axial direction against the support ring. In this case, the tension disk therefore has a double function as a clamping or retaining element. The assembly of the seal or seal assembly can thereby be further simplified. Thus, the seal can already be fixed on the support ring before installation of the seal in the seal assembly by means of the tension disk and in this way a jointly manageable assembly or sealing unit can be provided.

In particular, the seal can consist according to the invention of a viscoelastic material, in particular of polytetrafluoroethylene (PTFE) or a PTFE compound. As a result, frictional forces occurring between the seal and the second machine element can be kept low.

According to the invention, the support ring can consist of metal or a metal alloy, in particular steel or bronze, of a thermosetting plastic, a thermoplastic or a ceramic material.

The invention will be explained in more detail with reference to exemplary embodiments shown in the drawing. The embodiments shown and described are not to be understood as exhaustive enumeration, but rather have exemplary character for the description of the invention.

DETAILED DESCRIPTION OF THE PREFERRED EMBODIMENTS

Figure 1:
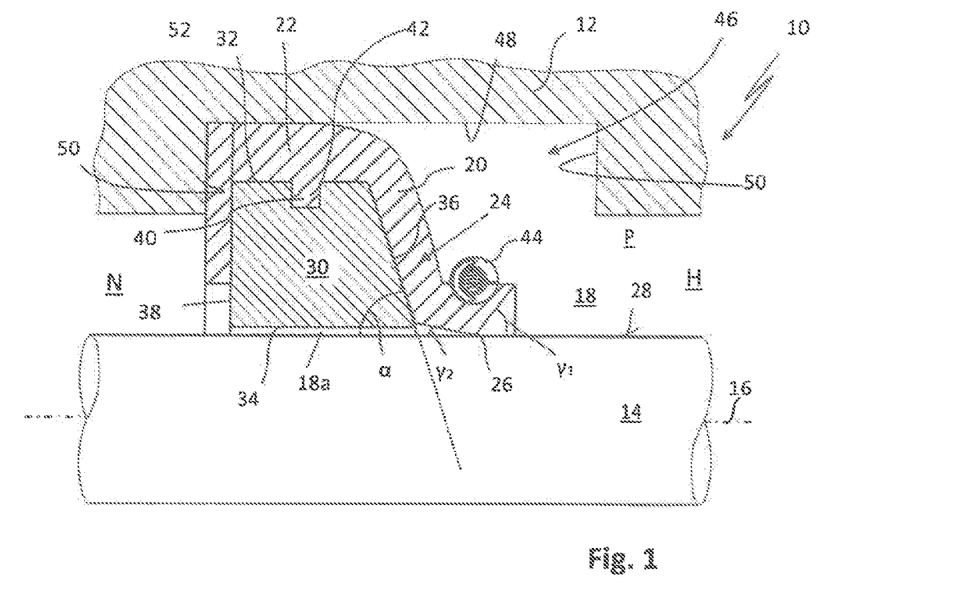
FIG. 1 shows a seal assembly designed as a seal with a radial seal ring, which is supported in the axial and radial directions on a support ring.

FIG. 1 shows a seal assembly 10 with a first and a second machine element 12, 14 which are movable relative to one another about or along a movement axis labeled 16. A seal gap 18 is formed between the two machine elements 12, 14. A seal 20 serves to seal a high-pressure side H of the seal gap 18 pressurizable with a fluid against a low-pressure side N of the seal gap. The seal 20 is embodied here purely by way of example in the radial direction (dynamically), and comprises a retaining section 22 with a primary sealing lip 24, which extends from the retaining section 22 on the high-pressure side, here in a radial direction. It is understood that the seal 20 can also be designed to be externally sealing in the radial direction. The primary sealing lip 24 has at one end a sealing edge 26, via which the primary sealing lip 24 of the seal ring 20 bears against a sealing surface 28 of the second machine element 14 in a dynamically sealing manner. Contact surface angles of the sealing edge are denoted by $\gamma_1$, $\gamma_2$. The contact surface angle $\gamma_1$ which is open to the high-pressure side is greater than the contact surface angle $\gamma_2$ which is open towards the low-pressure side. The seal 20 may consist wholly or partly of a rubber elastic deformable material, in particular an elastomer, or a viscoelastic deformable material such as polytetrafluoroethylene (PTFE) or a PTFE compound.

The seal assembly 10 further includes a support ring 30. The support ring 30 has a large module compared to the material of the seal 20. In other words, the support ring 30 is inherently rigid and dimensionally stable against forces which act on the support ring 30 during operation of the seal assembly 10. The support ring 30 may in this respect consist in particular of metal, for example bronze or steel, but also of a thermosetting plastic or a thermoplastic. Also, the support ring 30 may consist of a technical ceramic.

The support ring 30 has a first side 32 facing the first machine element 12 and a second side 34 facing the second machine element 14, i.e. its sealing surface 28. The first side 32 corresponds here to the radially outer circumferential surface and the second side to the radially inner circumferential surface of the support ring 30. The support ring 30 can be arranged slightly spaced from the sealing surface 28 of the second machine element 14 (in normal operation) as shown in FIG. 1. The support ring has in this case a larger inner diameter compared to the outer diameter of the second machine element (not labeled). The seal gap 18 is thus reduced in this case between the second side 34 of the support ring 30 and the sealing surface 28 to a small clearance 18a. The clearance 18a extends parallel to the sealing surface 28 over the entire width of the support ring 30. A clearance 18a is to be understood as meaning a volume of space in which no component of the seal assembly 10 is arranged.

The support ring 30 has, in cross-section, a first side edge 36 facing the high-pressure side H and a second side edge 38 facing the low-pressure side N. The first side edge 36 is arranged obliquely relative to the sealing surface 28 of the second machine element and encloses an angle α open towards the low-pressure side N with the sealing surface 28 or the movement axis 16. The primary sealing lip 24 of the seal 20 directly abuts the first side edge 36 of the support ring 30 and is supported thereon in the direction of the low-pressure side N. According to FIG. 1, the second side edge can be arranged approximately orthogonally to the sealing surface 28.

The retaining portion 22 of the seal 20 is held in (radial) press fit between the support ring 30 and the first machine element 12 and abuts the first machine element 12 in a directly statically sealing manner. To fix the position of the seal 20 relative to the support ring 30, the seal 20 has a plurality of profile projections 40. The profile projections 40 each engage in a corresponding recess 42 of the support ring 30. The profile projections 40 may be arranged on the first side 32 or on the first side edge 36 of the support ring 30.

The profile projections 40 and the corresponding recesses 42 of the support ring 30 are arranged spaced from each other in a row in the circumferential direction of the support ring 30 and the seal. Through this mutual engagement of the seal 20 and the support ring 30, the assembly of the seal can be simplified and unwanted slippage of the seal 20 from the support ring 30 is avoided during operation. In addition, the seal 20 can thereby be fixed rotatably on the support ring 30.

The profile projections 40 of the seal can be arranged in the respective recess 42 of the support ring 30 in a form-fitting or press-fitted manner. It is understood that alternatively or additionally, the support ring 30 may be provided with such projections 40 which engage in corresponding recesses of the seal 20. The support ring 30 and the seal can, as required in the region of the profile projections/recesses, be glued together.

The support ring 30 serves to guide, stabilize and protect the seal 20 from mechanical or thermal overstress during operation. On the one hand, the support ring 30 ensures reliable support and thus deformation protection of the primary sealing lip 24 when pressure is applied to the high-pressure side H with an operating pressure P. The primary sealing lip 24 of the seal 20 advantageously abuts over a majority, preferably more than 80%, of its longitudinal extent, the first side edge 36 of the support ring 30. As a result of the primary sealing lip 24 being arranged extending in the axial and in the radial direction, the latter can balance or compensate for a smaller eccentricity of the two machine elements 12, 14 without this resulting in an impairment of the sealing function of the seal 20. Through the support ring 30, an excessive contact surface pressure of the seal 20 or the sealing edge 26 and the sealing surface 28 can be counteracted. For example, if the second machine element 14 having a sealing surface 28 has an eccentricity, the sealing surface 28 can strike the support ring 30 and carry this along in the radial direction. As a result of the first side edge 36 running obliquely from the low-pressure side N in the direction of the high-pressure side H toward the sealing surface, the primary sealing lip 24 can in turn be reliably carried along by the support ring (in sections) 30 in the radial direction and relieved in the region of its sealing edge 26.

The primary sealing lip 24 may be pretensioned with its sealing edge 26 by means of an elastically deformable pretensioning member 44 against the sealing surface 28 of the second machine element 14. The pretensioning member 44 may be designed as shown in FIG. 1 as a worm spring or alternatively as an elastomer or rubber ring.

The first machine element 12 may have a seal-retaining structure in the form of a retaining groove 46 having a groove bottom 48 and at least one groove flank 50 for the seal 20. In the case of a radially sealing seal 20, the retaining section of the seal 20 thus lies in a statically sealing manner in the radial direction on the groove bottom 48 of the retaining groove 46. The seal assembly may also have a known securing ring 52.

Figure 2:
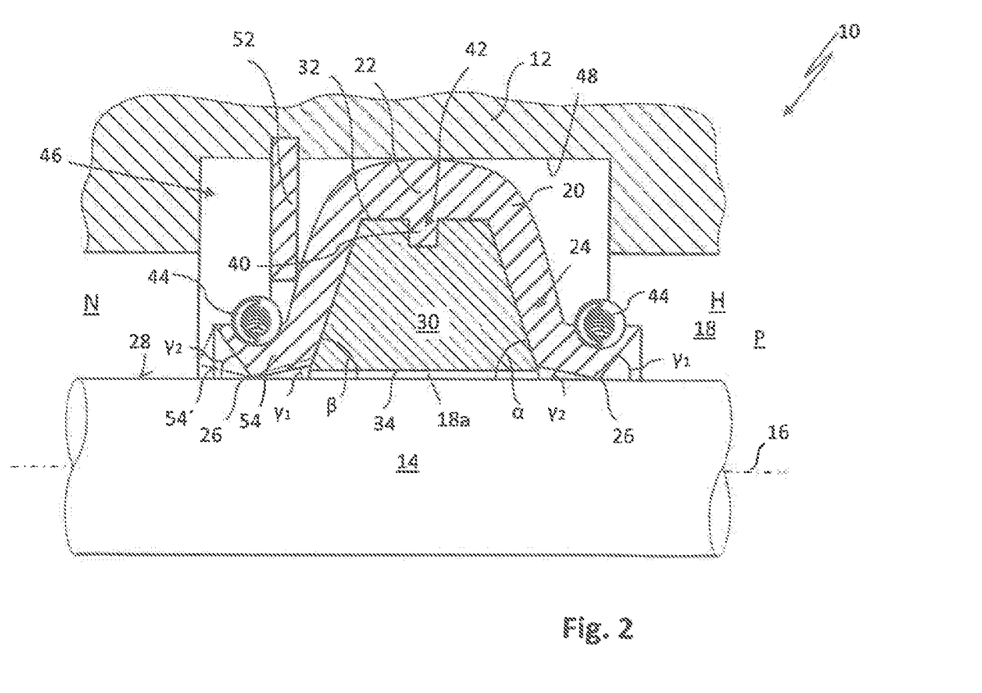
FIG. 2 shows a seal assembly with a seal designed as a radial seal ring which, in addition to a primary sealing lip, has a secondary sealing lip or wiper lip arranged on the low-pressure side, in a partial sectional view.

FIG. 2 shows a further seal assembly 10, which differs from the exemplary embodiment shown in FIG. 1 substantially in that the seal 20 has a wiper lip 54 or a secondary sealing lip 54' represented by a dashed line. In the other embodiments shown in the drawing, a wiper lip 54 is uniformly shown for the sake of clarity, which is also to be considered representative of the alternative embodiment of a secondary sealing lip 54' shown in FIG. 2. The wiper lip 54 differs from the secondary seal lip 54' with respect to its contact surface angles $\gamma_1 \gamma_2$. In the wiper lip 54, the high-pressure-side contact surface angle $\gamma_1$ is smaller than the low-pressure-side contact surface angle $\gamma_2$. In the case of the secondary sealing lip 54', the high-pressure-side contact surface angle $\gamma_1$ is greater than the low-pressure-side contact surface angle $\gamma_2$. The wiper lip 54 or secondary sealing lip 54' and the primary sealing lip 24 are integrally connected to one another via the common retaining section 22 of the seal 20. Here, the primary sealing lip 24 extends away from the retaining section 22 in a radial direction and abuts with its sealing edge 26 against the sealing surface 28 of the second machine element 14 in a dynamically sealing manner. The support ring 30 may have a trapezoidal cross-sectional shape. The low-pressure-side second side edge 38 of the support ring 30 is arranged obliquely to the sealing surface 28 and to the movement axis 16 and encloses with this an angle β open to the high-pressure side H. The angle β is advantageously between 45° and 80°, preferably about 70°. The angle α and the angle β here coincide with each other or substantially coincide with each other.

The primary sealing lip 24 directly abuts against the first side edge 36 of the support ring 30 and is supported thereon on the low-pressure side in the axial as well as in the radial direction. The wiper lip 54 or secondary sealing lip 54' abuts in a manner corresponding to the primary sealing lip 24 over more than 80% of its longitudinal extent on the second side edge 38 of the support ring and is supported thereon in the radial and in the axial direction (toward the high-pressure side H). The primary as well as wiper/secondary sealing lip 24, 54, 54' can abut in each case against the sealing surface of the second machine element 14 in a (dynamically) sealing manner by means of an elastically deformable pretensioning member 44, here a worm spring. In the case of the seal assembly shown in FIG. 2, the two sealing lips bound the clearance 18a in the axial direction. This clearance 18a may serve as a lubricant reservoir or the like.

Figure 3:
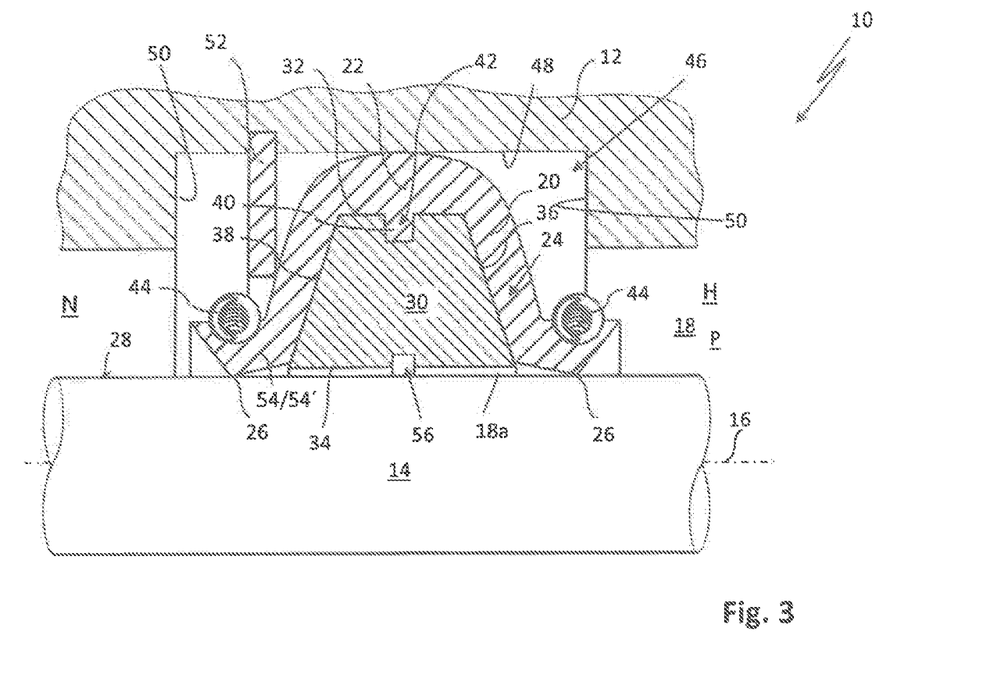
FIG. 3 shows a seal assembly in which the support ring has a depression on the sealing surface side which serves as a lubricant or separating agent reservoir.

The support ring 30 may have on its sealing-surface-side second side 34 of FIG. 3, one or more recesses 56, in particular annular grooves, which is/are each designed open toward the sealing surface 28. Each recess 56 can serve as a reservoir for a lubricant or a liquid sealing or separating agent (not shown). A silicone oil or other suitable liquid can be used, for example, as a release agent.

Figure 4:
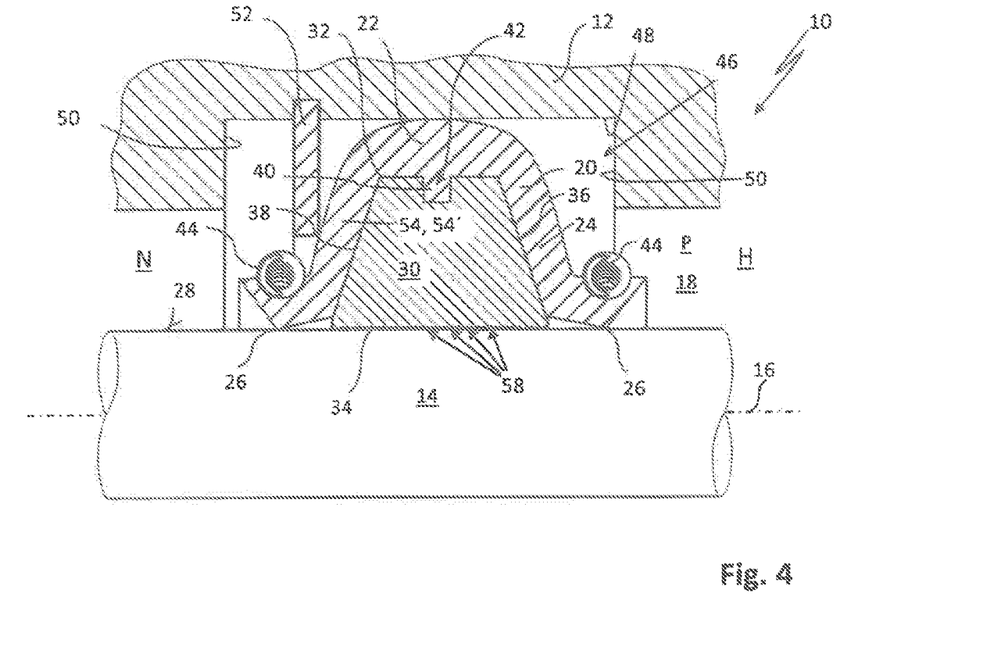
FIG. 4 shows a seal assembly in which the support ring is provided on the sealing surface side with tribo structures for an improved return drag behavior of the seal assembly, in a partial sectional view.

The support ring 30 of the seal assembly 10 may abut on the sealing surface 28 of the second machine element 14 according to the embodiment shown in FIG. 4. In the case of a seal sealing in the radial direction, the support ring abuts the sealing surface of the second machine element in the radial direction, and in the case of a seal sealing in the axial direction it abuts in the axial direction 14. In any case, the support ring 30 is thus supported on the sealing surface 28 of the second machine element 14.

The support ring 30 can advantageously have tribo structures 58 on its second side, that is to say on the inner circumferential side, in order thereby to improve the return drag behavior of the seal assembly 10 and thus the lubricating behavior of the seal assembly 10 in the dynamic contact surface area of the seal ring 20 and the sealing surface 2. It should be noted that the support ring 30 does not have to contact the sealing surface 28 directly with regard to the functionality of the tribo structures 58, as is shown by way of example in FIG. 4, even if this makes it possible to increase the return drag behavior of the seal assembly 10 even further. The tribo structures 58 may include depressions, in particular flutes, grooves and the like or elevations on the second side of the support ring 30.

Figure 5:
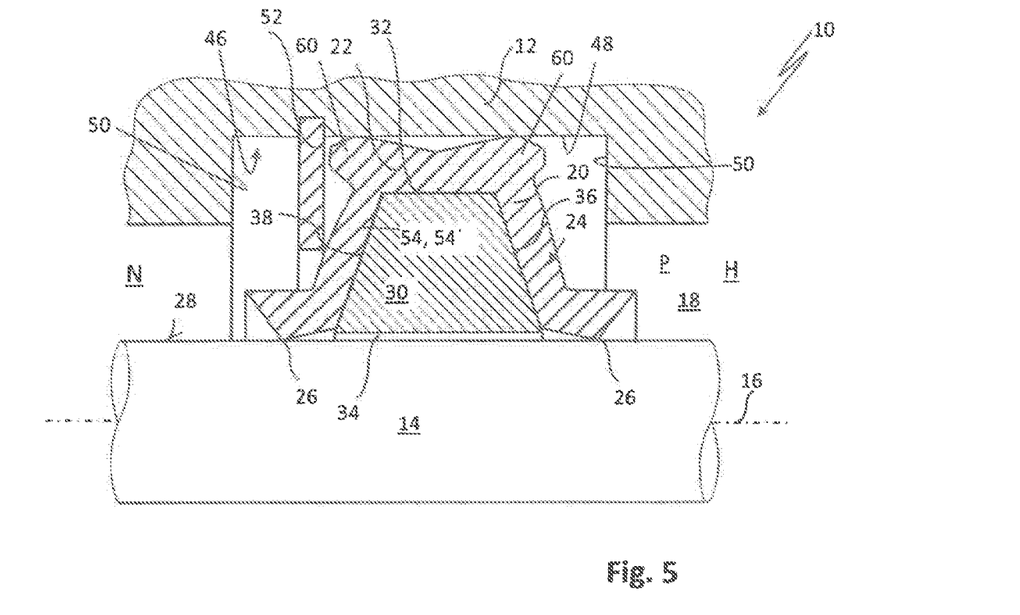
FIG. 5 shows a seal assembly in which the sealing element abuts against the sealing surface of the second machine element solely on the basis of the elastic resilience inherent in its material, the seal additionally being (statically) pretensioned in a sealing manner by the support ring against the first machine element, in a partial sectional view.

According to FIG. 5, the seal 20 may have a retaining section 22 with two or more sealing beads 60 which extend away from the retaining section in a direction away from the sealing surface. The retaining portion of the seal can rest on these sealing beads 60 on the first machine element, for example on a groove bottom 48 of the retaining groove 46, in a statically sealing manner. The seal ring 20 with its dynamic sealing edges 26 and its sealing beads 60 abuts in a sealing manner the sealing surface 28 of the second machine element or the first machine element 12 here only due to a material intrinsic inherent elasticity of the sealing surface. It is understood that the support ring 30 can contact the sealing surface 28 in a manner corresponding to the embodiment shown in FIG. 4.

Figure 6:
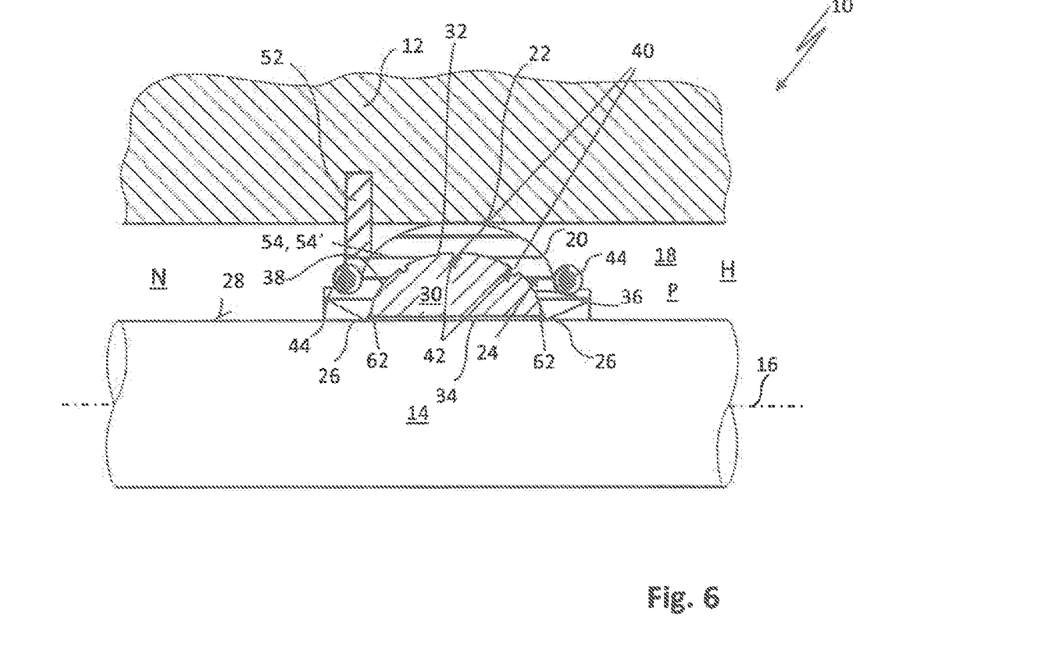
FIG. 6 shows a seal assembly in which the support ring has a hemispherical or substantially hemispherical cross-sectional shape, in a partial sectional view.

According to the seal assembly 10 shown in FIG. 6, the support ring 30 may have a substantially hemispherical or (semi-)spherical segment-shaped cross-sectional shape. The support ring 30 thus has in this case a first side 32 extending curved in the direction of the width extension of the support ring 30 with (outwardly convex) curved side edges 36, 38 and a second side 34 facing the sealing surface 28 of the second machine element 14. The first and the second side 32, 34 are directly connected to one another here in the region of edges 62 of the support ring 30. The seal 20 can also be tensioned in this embodiment by two elastically deformable pretensioning elements, such as worm springs or elastomer or rubber rings, against the sealing surface 28 of the second machine element 14.

Profile projections 40 of the support ring 30 and the seal 20, which engage in a positive-locking or friction-locking manner in corresponding recesses of the respective other component, can also serve for a positional securing of the seal ring 20 relative to the support ring 30. These recesses 42 may already be present in the non-assembled state in the respective component.

Figure 7:
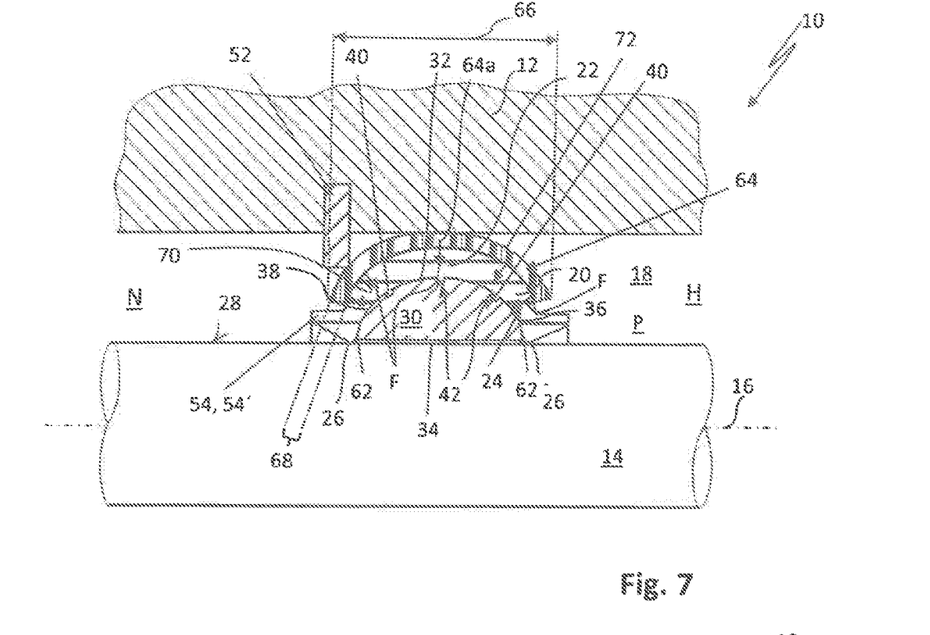
FIG. 7 shows a seal assembly in which the seal is arranged held by means of a tension disk on the support body in the axial and radial directions, wherein the tension disk consists of a rubber elastic deformable material and abuts, pretensioned in the radial direction, the first machine element in a statically sealing manner by the support ring in the radial direction, in a partial sectional view.

FIG. 7 shows a seal assembly 10 which differs substantially from the seal assembly 10 shown in FIG. 6 in that a separately formed annular or sleeve-shaped tension disk 64 is arranged between the first machine element 12 and the seal 30. The tension disk 64 here consists of a rubber elastic deformable material. This may be, for example, an elastomer or rubber. It is understood that the material of the tension disk 64 may have fillers or other additives. The tension disk 64 has a width 66 (axial here) which is greater by a multiple than the thickness 68 (radial here) of the tension disk 64. The thickness 68 of the tension disk 64 is advantageously uniform or substantially uniform. However, the thickness 68 of the tension disk 64 can also vary in certain areas. The tension disk 64 has an inner side 70 facing the sealing surface 28 and an outer side 72 facing the first machine element 12. The inside 70 of the tension disk 64 is concave in the axial direction. The outside 72 of the tension disk 64 is convex in the axial direction. The tension disk 64 abuts against the outside with its sealing portion 64a on the first machine element 12 in a statically sealing manner.

Over its entire width 66 with its concavely shaped inner surface 70, the tension disk 64 also abuts the seal 20 on the outside circumferentially (and also sealingly). The tension disk 64 thus forms a sealing cap which abuts the seal 20 in a positive-locking manner. There is a positive connection between the tension disk 64 and the seal 20 in this case. Through the tension disk 64, the seal 20 is held clamped in the radial and in the axial direction on the support ring 30. The forces F acting on the seal by the tension disk 64 are illustrated graphically in FIG. 7 by arrows. The tension disk 64 thus has a double function. On the one hand, it tensions the seal 20 against the convex curved first side 32 and the two curved side edges 36, 38 of the support ring 30, on the other hand, a static seal of the first machine part 12 relative to the dynamically acting seal 20 is effected by the tension disk 64.

Figure 8:
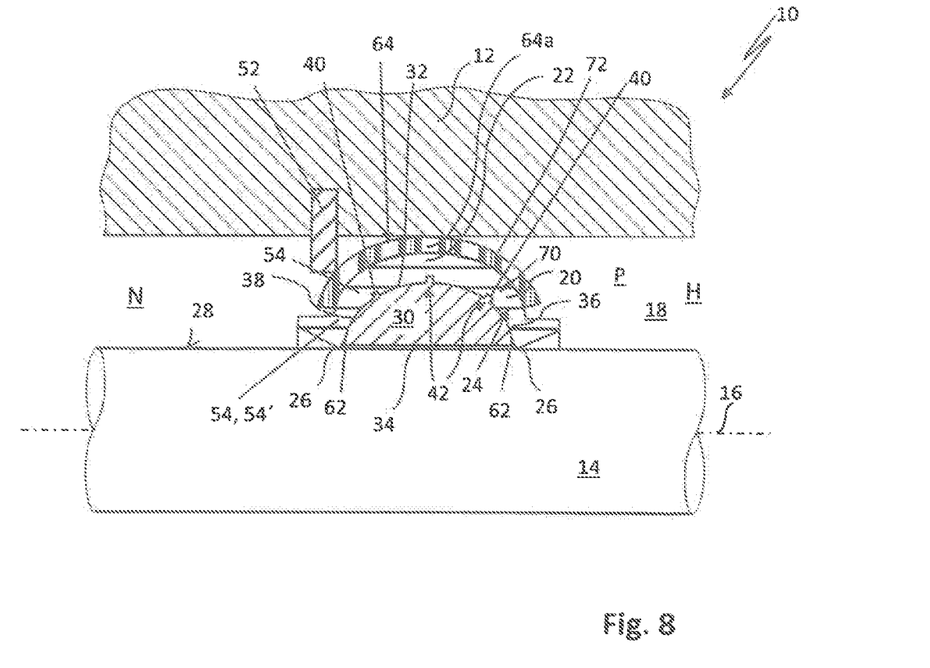
FIG. 8 shows a seal assembly similar to the seal assembly according to FIG. 7, in a partial sectional view.

It is understood that even with this type of seal assembly 10, the profile projections for fixing the position of the seal on the support ring may be integrally formed on the seal 20, as shown in FIG. 8. Also, the second side 34 of the support ring 30 facing the sealing surface 28 may be provided with a groove or with tribo structures serving as a lubricant or separating reservoir for lubricant return.

Figure 9:
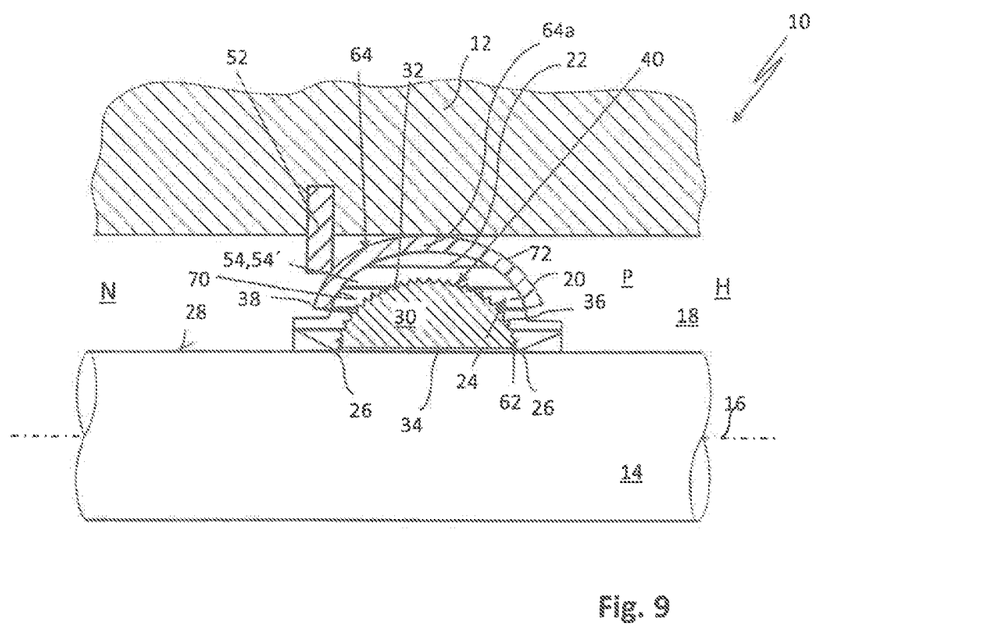
FIG. 9 shows a seal assembly in which the support ring has tapered profile projections, which engage in the material of the seal, in a partial sectional view.

An advantageous embodiment of the seal assembly 10 with respect to design and production is shown in FIG. 9. Here, a plurality of profile projections 40 are integrally formed on the support ring 30. The profile projections 40 are designed in the form of claw elements, which engage in the material of the seal 20. Here, the seal 20 has no recesses for the profile projections 40 of the support ring before mounting the seal assembly 10. Rather, the profile projections 40 cling during assembly in the material of the seal 20 in a displacing or cutting manner, i.e. locally destructively. For this purpose, the profile projections 40 preferably have a cross-sectional profile which tapers in the direction of its, preferably pointed, free end 74. The tension disk 64 abuts the first machine element 12 in a statically sealing manner at all times in the operating state of the seal assembly 10.

The seal 20 may be arranged analogously to the representation in FIG. 5 in a retaining groove 46 of the first machine element 12 and/or be secured in position in the axial direction towards the low-pressure side N by means of a securing ring 52 on the first machine element 12.

Figure 10:
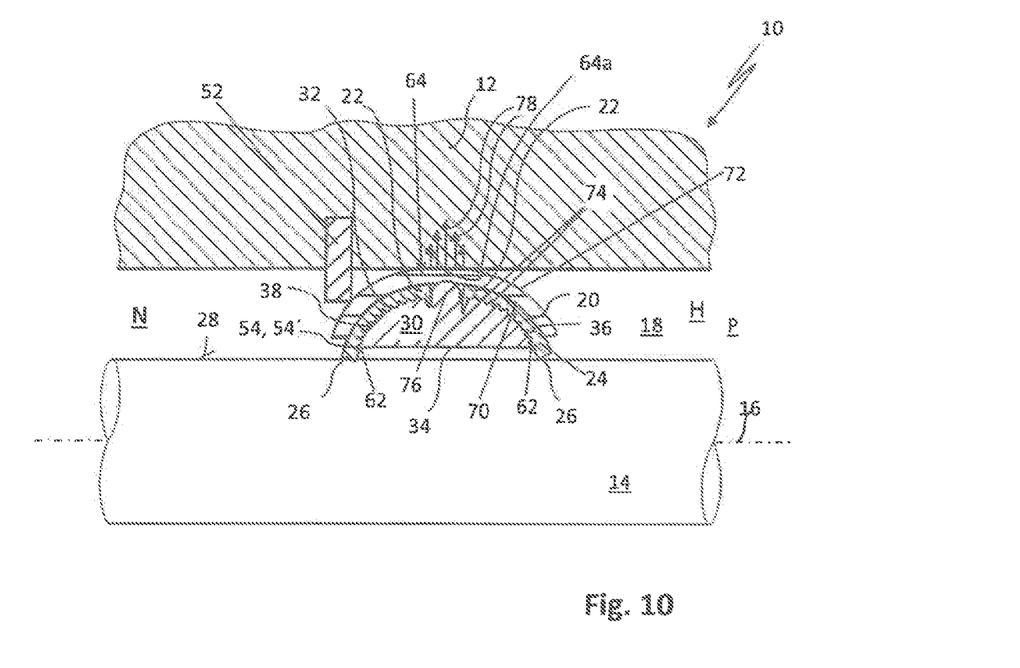
FIG. 10 shows a seal assembly in which the seal is made in two parts, wherein the support ring has a central projection which compresses locally in the material of the rubber-elastic deformable tension disk, in a partial sectional view.

FIG. 10 shows a further seal assembly 10, which essentially differs from the seal assembly 10 shown in FIG. 9 in that the seal 20 is embodied here in two parts. The seal 20 here comprises a primary sealing lip 24 arranged on the high-pressure side and a wiper/secondary sealing lip 54, 54' arranged on the low-pressure side. The two retaining portions 22 of the seal 20 are arranged spaced apart in the axial direction. The support ring 30 has an annular collar 76 in the region of its apex. The annular collar 76 is integrally formed on the support ring 30 and designed executed circumferentially closed. The annular collar 76 extends in the seal 20 designed as a radial seal away in the radial direction from the first side 32 of the support ring 30 in the direction of the first machine element 12. This annular collar 76 serves to pretension the tension disk 64 in the radial direction against the first machine element 12. Through the annular collar 76, the rubber-elastically deformable tension disk 64 is locally compressed in the area. A contact surface pressure 78 between the tensioning disk 64 and the first machine element 12 is therefore greatest in the region of the sealing portion 64a of the tensioning disk 64 covering the annular collar 76 in the radial direction and decreases on both sides of the annular collar 76.

Figure 11:
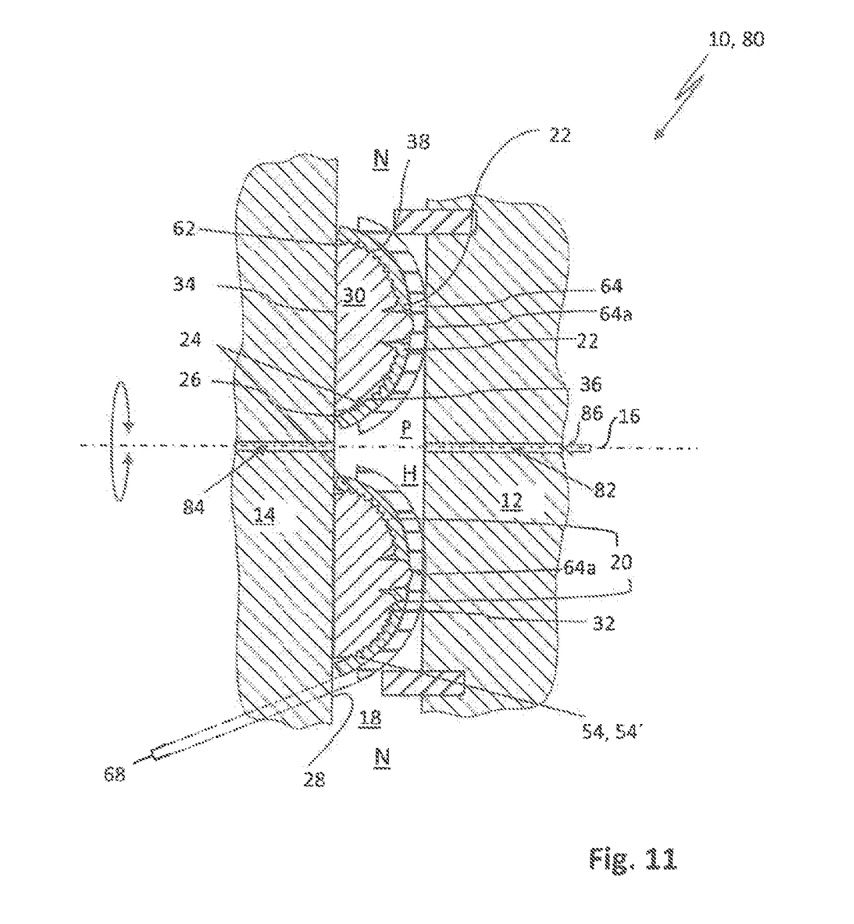
FIG. 11 shows a seal assembly in which the seal is designed as an axial seal ring, in a partial sectional view.

In FIG. 11, a seal assembly 10 is shown, in which the seal 20 is designed to be axially sealing relative to the movement axis 16 of the two machine elements 12, 14. The two machine elements 12, 14 are rotatably adjustable relative to each other about the movement axis 16 here. The seal assembly 10 may be designed in the form of a rotary feedthrough 80 as shown in FIG. 11. In this case, the first and second machine elements 12, 14 each have a fluid channel 82, 84, which are fluidly connected to one another via the high-pressure side H of the seal gap 18. A fluid 86, for example a liquid or a gas/gas mixture, can be introduced into the fluid channel 84 of the second machine element 14 via the fluid channel 82 of the first machine element. The support ring 30 rests here with its second side 34 on the sealing surface 28 of the second machine element 14 in each operating state. The sealing surface 28 serves the support ring 30 as an abutment, so that the seal 20 and the clamping plate 64 are held between the support ring 30 and the first machine element 12 in axial press fit. The tension disk 64 abuts with its sealing portion 64a the first machine element 12 in a statically sealing manner and is fixed to this non-rotatably.

The seal 20 of the seal assemblies 10 explained above in connection with FIGS. 1 to 11 may in particular consist of a viscoelastic material such as, for example, polytetrafluoroethylene (PTFE). The tension disk 64 shown in FIGS. 7 to 11 is preferably made of an elastomer. The seal 20, the support ring 30 and, if present, the tension disk 64 may, if necessary, be arranged in a known per se cartridge of metal or other suitable material, which is positioned in the seal gap 16.

Figure 12:
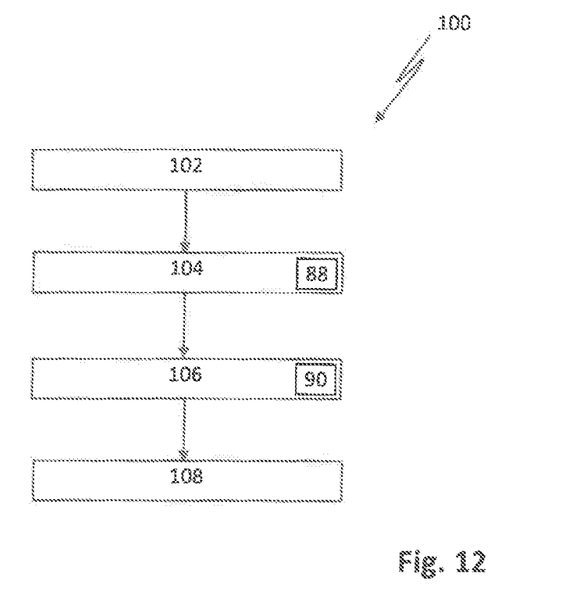
FIG. 12 shows a block diagram with individual method steps of a method for producing a seal assembly according to FIG. 7.

The manufacturing method 100 according to the invention for a seal assembly 10 according to FIGS. 7 to 11 is explained below with additional reference to FIG. 12.

In step 102, the tension disk 64 (FIG. 7) is created by piercing or cutting free the tension disk 64 from a provided rubber elastic hose 88. In a further step 104, the seal 20 is mounted or brought up on the support ring 30. In a further step 106, which may optionally also take place at the same time as step 104, the tension disk 64 is mounted peripherally on the seal 20 with an elastic deformation of the tension disk 64, so that it is pressed against the supporting ring 30. The tension disk 64, the seal 20 and the support ring 30 thus form a sealing unit 90 to be handled and assembled jointly. In a further step 110, the sealing unit 90 is arranged in the seal gap 18 between the two machine elements 12, 14.

What is claimed is:

1. A seal assembly, comprising:
   a first and a second machine element which, while forming a seal gap arranged between the two machine elements, are spaced apart from one another and are movable relative to one another along/about a movement axis;

a seal for sealing a high-pressure side H of the seal gap which can be pressurized with a fluid against a low-pressure side N of the seal gap; and a support ring with a first side edge facing the high-pressure side H which is at least partially convexly curved or which is formed obliquely towards the high-pressure side H or at least partially formed at an acute angle α relative to the axis of movement of the two machine elements;

wherein the seal has a retaining portion and at least one primary sealing lip extending on the high-pressure side from the retaining portion and abuts in a dynamically sealing manner against a sealing surface of the second machine element;

wherein the primary sealing lip directly abuts and is supported over the majority of its longitudinal extent on the first side edge of the support ring on the high-pressure side; and wherein the seal comprises a wiper or secondary sealing lip which abuts the sealing surface of the second machine element, wherein the support ring has a second side edge facing the low-pressure side N which is at least partially convexly curved or which is formed at an acute angle β relative to the axis of movement and wherein the wiper or secondary sealing lip directly abuts and is supported on the second side edge of the support ring, and wherein the retaining portion of the seal is held clamped between the support ring and the first machine element and abuts the first machine element in a statically or indirectly statically sealing manner;

wherein the support ring is spaced apart from the second machine element in normal operation of the seal assembly, wherein the seal is one piece, wherein a tension disk made of an elastic deformable material is arranged between the support ring and the first machine element, wherein said tension disk is in direct contact with and abuts the first machine element in a statically sealing manner, and wherein the seal is tensioned against the support ring by the tension disk at least partially in a radial direction and in an axial direction.

2. The seal assembly according to claim 1, wherein the support ring has tribo structures on its side facing the sealing surface of the second machine element.

3. The seal assembly according to claim 2, wherein the support ring abuts against the sealing surface of the second machine element.

4. The seal assembly according to claim 1, wherein the support ring abuts against the sealing surface of the second machine element.

5. The seal assembly according to claim 1, wherein the primary sealing lip of the seal abuts and is supported on the first side edge of the support ring for more than 80% of its longitudinal extent.

6. The seal assembly according to claim 1, wherein the support ring or the seal is provided with a profile projection which extends away from the support ring or the seal and into a recess of the respective other component corresponding to the profile projection.

7. The seal assembly according to claim 1, wherein the support ring or the seal is provided with a plurality of profile projections which extend away from the support ring or the seal and into a recess of the respective other component corresponding to the profile projection.

8. The seal assembly according to claim 1, wherein the wiper/secondary sealing lip abuts and is supported on the second side edge of the support ring.

9. The seal assembly according to claim 1, wherein the wiper/secondary sealing lip abuts and is supported on the second side edge of the support ring over more than 80% of its longitudinal extent.

10. The seal arrangement according to claim 1, wherein the primary sealing lip and/or the wiper/secondary sealing lip is brought in position pretensioned by means of an elastic, deformable pretensioning elements on the sealing surface of the second machine element.

11. The seal arrangement according to claim 1, wherein the primary sealing lip and/or the wiper/secondary sealing lip is brought in position pretensioned by means of a rubber-elastic, deformable pretensioning elements on the sealing surface of the second machine element.

12. The seal assembly according to claim 1, wherein the seal consists of a viscoelastic material.

13. The seal assembly according to claim 1, wherein the seal consists of a viscoelastic material being polytetrafluoroethylene (PTFE) or a PTFE compound.

14. The seal assembly according to claim 1, wherein the support ring consists of metal being steel or bronze, of a thermosetting plastic, of a thermoplastic or of a ceramic material.

15. The seal assembly according to claim 1, wherein the seal is tensioned against the support ring by the tension disk at least partially in a radial direction and bilaterally in an axial direction.

16. The seal assembly according to claim 1, wherein the tension disk has a width which is greater by a multiple than a thickness of the tension disk.

17. The seal assembly according to claim 1, wherein the tension disk has an inner side facing the sealing surface and an outer side facing the first machine element, wherein the inner side of the tension disk is concave in the axial direction and the outer side of the tension disk is convex in the axial direction.

18. The seal assembly according to claim 1, wherein the primary sealing lip of the seal abuts and is supported on the first side edge of the support ring more than 80% of its longitudinal extent, and wherein the secondary sealing lip of the seal abuts and is supported on the second side edge of the support ring over more than 80% of its longitudinal extent.

19. A seal assembly, comprising:

a first and a second machine element which, while forming a seal gap arranged between the two machine elements, are spaced apart from one another and are movable relative to one another along/about a movement axis;

a seal for sealing a high-pressure side H of the seal gap which can be pressurized with a fluid against a low-pressure side N of the seal gap; and a support ring with a first side edge facing the high-pressure side H which is at least partially convexly curved towards the high-pressure side H or which is formed at least partially obliquely towards the high-pressure side H at an acute angle α relative to the axis of movement of the two machine elements;

wherein the seal has a retaining portion and at least one primary sealing lip extending on the high-pressure side from the retaining portion and abuts in a dynamically sealing manner against a sealing surface of the second machine element;

wherein the primary sealing lip directly abuts and is supported over the majority of its longitudinal extent on the first side edge of the support ring on the high-pressure side; and wherein the seal comprises a wiper or secondary sealing lip which abuts the sealing surface of the second machine element, wherein the support ring has a second side edge facing the low-pressure side N which is at least partially convexly curved towards the low-pressure side N or which is formed at least partially obliquely towards the low-pressure side N at an acute angle β relative to the axis of movement and wherein the wiper or secondary sealing lip directly abuts and is supported on the second side edge of the support ring, and wherein the retaining portion of the seal is held clamped between the support ring and the first machine element and abuts the first machine element in a statically or indirectly statically sealing manner;

wherein the seal is one piece, wherein a tension disk made of an elastic deformable material is arranged between the seal and the first machine element, wherein said tension disk is in direct contact with and abuts the first machine element in a statically sealing manner, and wherein the seal is tensioned against the support ring by the tension disk at least partially in a radial and in an axial direction; and wherein the support ring abuts against the sealing surface of the second machine element.

20. The seal assembly according to claim 19, wherein the primary sealing lip of the seal abuts and is supported on the first side edge of the support ring more than 80% of its longitudinal extent, and wherein the secondary sealing lip of the seal abuts and is supported on the second side edge of the support ring over more than 80% of its longitudinal extent.

* * * * *

UNITED STATES PATENT AND TRADEMARK OFFICE
CERTIFICATE OF CORRECTION

| | | |
|---|---|---|
| PATENT NO. | : 11,920,681 B2 | Page 1 of 1 |
| APPLICATION NO. | : 16/563078 | |
| DATED | : March 5, 2024 | |
| INVENTOR(S) | : Holger Jordan and Mandy Wilke | |

It is certified that error appears in the above-identified patent and that said Letters Patent is hereby corrected as shown below:

On the Title Page

Column 1, below the Related U.S. Application Data:
Insert --Foreign Application Priority Data
Mar. 16, 2017 (DE) ........ 10 2017 204 3741--.

In the Claims

Column 12, Claim 10, Line 8, "seal arrangement" should read --seal assembly--.

Column 12, Claim 11, Line 13, "seal arrangement" should read --seal assembly--.

Signed and Sealed this
Seventh Day of May, 2024

Katherine Kelly Vidal
Director of the United States Patent and Trademark Office